Patented Nov. 19, 1935

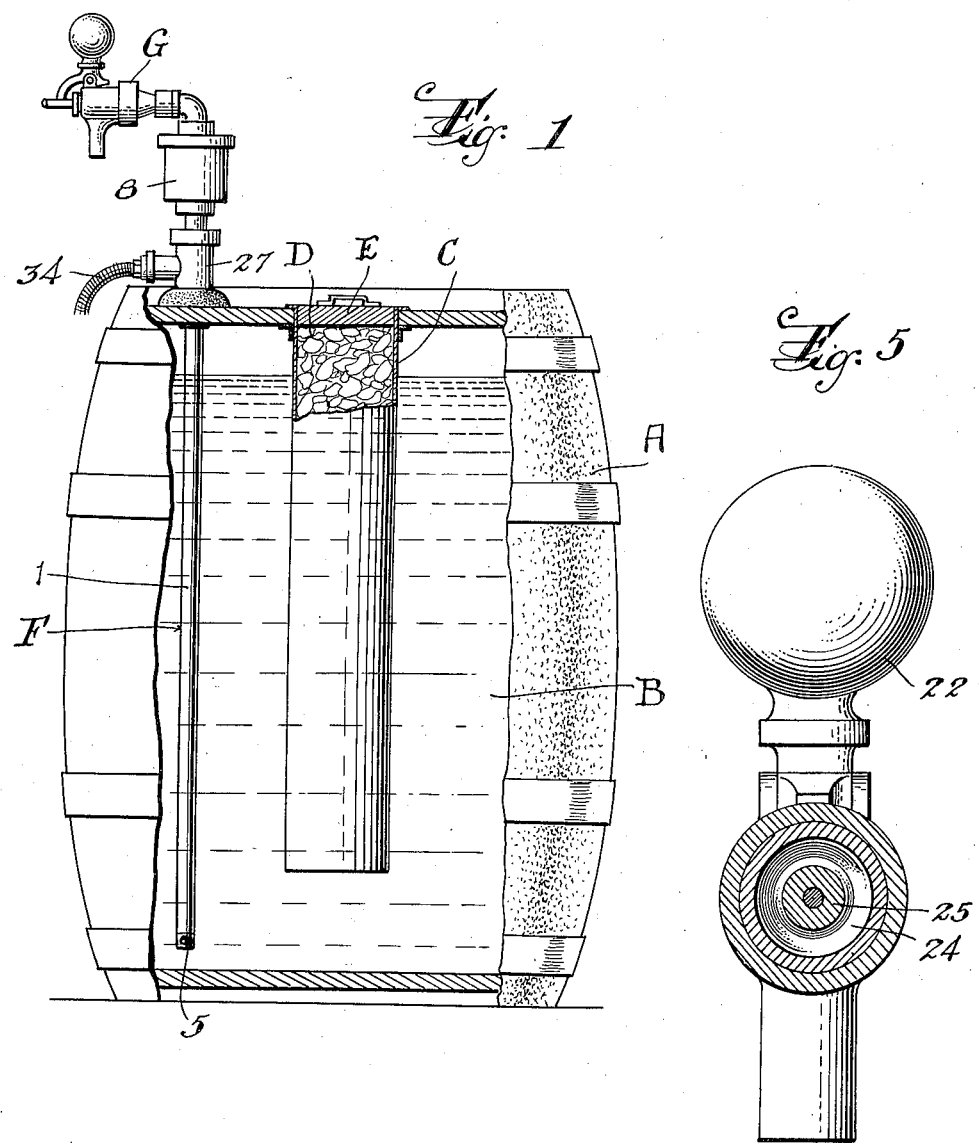

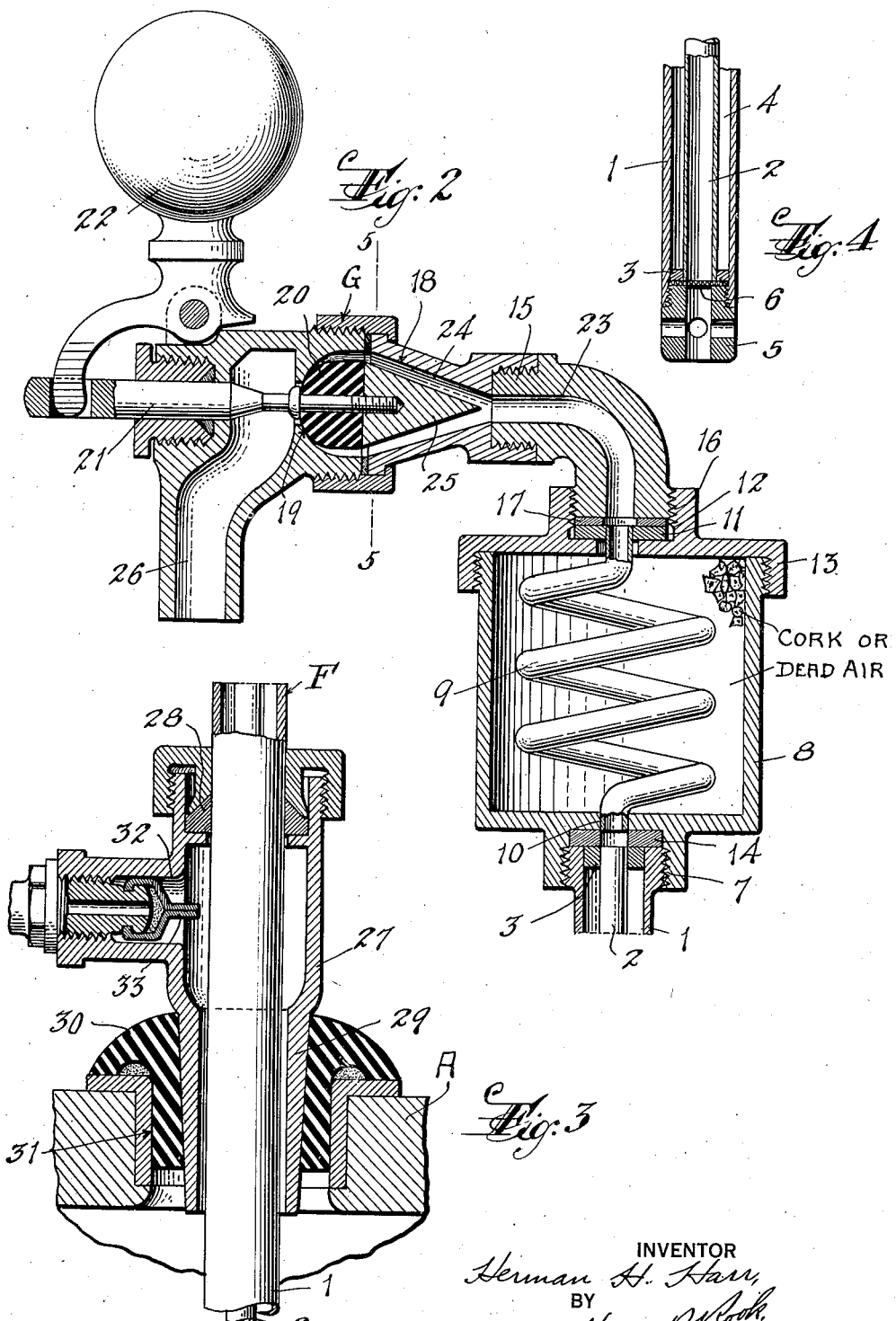

2,021,305

UNITED STATES PATENT OFFICE 2,021,305

METHOD OF AND APPARATUS FOR DISPENSING BEVERAGES

Herman H. Harr, Newark, N. J.

Application May 3, 1934, Serial No. 723,755

REISSUED

8 Claims. (Cl. 225—1)

Certain beverages, for example beer and carbonated beverages, contain activating gases which it is desirable to retain in the beverages until they are consumed, since the absence of these activating gases causes the beverage to become "flat" or unpalatable.

It is desirable in many instances, to dispense such beverages, particularly beer, directly from the barrel or other container in which the beer is packed for transporation, and it is of course possible to withdraw at least some of the beverage from the container under the pressure of the gas contained in the beverage. However, when this is done, the gases are quickly dissipated and the beverage becomes unpalatable. It has also been a practice to inject gas such as air under pressure into the barrel or container above the beverage and to force the beverage from the container under such gas pressure. However, where this has been attempted with known apparatus, the gases frequently expand so as to create such a high pressure that the beverage cannot be deposited in a glass or other receptacle without considerable agitation, splashing and loss of beverage by overflow from the glass, and furthermore, excessive foaming of the beverage occurs and the activating gases in the beverage are lost.

One object of my invention is to provide a novel and improved method of and apparatus for dispensing for drawing beer, carbonated beverages, or the like directly from a barrel or other container containing beer under high pressure such as thirty pounds, without dissipation of the activating gases in the beverage and without material agitation of the beverage or splashing of the beverage into the glass or other receptacle or excessive foaming of the beverage as it is drawn into the glass.

Other objects, advantages and results of the invention will appear from the following description and the accompanying drawings.

In said drawings where corresponding and like parts are designated throughout the several views by the same reference characters, Figure 1 is a side elevation of a beverage dispensing apparatus embodying my invention, showing the same in combination with a barrel which is shown partially in vertical section.

Figure 2 is an enlarged vertical longitudinal sectional view through the outlet end of the dispensing apparatus.

Figure 3 is a similar view of a portion of the dispensing apparatus which is directly connected to the container.

Figure 4 is a similar view of the lower end of the draft pipe of the dispensing apparatus, that is, the end thereof which is located within the container, and Figure 5 is a sectional view on the line 5—5 of Figure 2.

In general, the invention contemplates maintaining the beer in calm liquid state by maintaining gas pressure on the beer in the container greater than that of the activating gases, and drawing the beer directly from the calm body of liquid in the container through a restricted passage which leads from a point adjacent the bottom of the container to the valve seat of a discharge faucet, said passage being formed to substantially reduce the pressure as the beer flows through said passage and maintain a substantially uniform small volume of flow per unit of length of the passage to prevent agitation and sudden expansion of the beer, whereby the beer is kept in substantially calm liquid condition to the discharge point, the activating gases are substantially retained in the beer and the beer may be dispensed into a glass without material splashing and without excess foaming.

Specifically describing the illustrated embodiment of the invention the reference character A designates a barrel which has therein a beverage B containing activating gases. These gases are usually at a pressure of approximately fifteen pounds per square inch, although the pressure may be considerably greater depending on the temperature of the beverage. The beverage within the container is refrigerated in any suitable manner; in the present instance a container C is inserted through one head of the barrel and may receive cracked ice or other suitable refrigerant D, the container being closed by a removable cover E. Obviously any other suitable refrigerating means may be provided.

Inserted through one head of the barrel is a dispensing apparatus which includes a draft pipe F inserted into the barrel with one end projecting therefrom and having connected thereto a discharge faucet G. The draft pipe includes a length of pipe I within which is mounted a section of thin walled tubing 2 of considerably smaller diameter than the pipe, the tubing being secured in the pipe by bushings 3 so as to form a dead air space 4 between the tube and the pipe. In the lower end of the pipe I is fitted a strainer head 5 between which and the end of the tube 2 is a screen 6 to prevent the passage of particles of pitch or other foreign matter into the tube. The other end of the pipe is connected at 7 to a casing 8 within which is arranged a helical coil of tubing 9 which is approximately of the same cross sectional area as the tube 2, one end of said coil communicating at 10 with one end of the tube 2 and the other end of the coil being connected to a washer 11 which is arranged in the base of a recess 12 in a removable cover 13 for the casing. A packing washer 14 is interposed between the end of the tube 2 and the casing 8 to provide a liquid tight joint between the tube 2 and the coil 9. The outlet end of the coil 9 communicates with a spigot or faucet 15 which is screw threaded at 16 into the cover 13 of the casing. A packing washer 17 is interposed between the end of the spigot and the washer 11 on the coil to provide a liquid tight connection. The faucet has a passage 18 therethrough in which is arranged a valve seat 19 with which cooperates a valve head 20 mounted on a slidable stem 21 which is reciprocated by a hand lever 22 for opening and closing the valve. The inlet end 23 of the passage 18 is preferably of the same cross-sectional area as the inside of the tube 2 and the tube of the coil 9, and said passage has a frusto-conical portion 24 which gradually increases in diameter inwardly of the faucet or toward the outlet end thereof. The valve head 20 has a frusto-conical extension 25 in the corresponding shaped portion 24 of the valve passage so that the cross sectional area of the portion 24 of the passage is approximately the same as the cross-sectional area of the portion 23 of the passage.

With this construction, the passage through the draft pipe is of approximately the same cross-sectional area throughout its length to the valve seat so as to provide a restricted outlet for the beverage, whereby the pressure of the beer is reduced during flow from the container to the valve seat and the coil 9 provides further resistance or restriction to the flow of the beverage through the draft passage. Due to the uniform and small cross-sectional area of the passage, no material expansion of the beverage can occur between the inlet end of the draft pipe and the valve seat 19, such as would cause foaming, and only a small stream of beverage can be discharged through the spigot so as to prevent splashing, and this is true even if the pressure in the barrel becomes high because of expansion of the gases in the barrel, as the result of increased temperature. Moreover, only a small quantity of beverage may accumulate in the faucet to become warm so that there is no waste of beverage as is entailed in drawing off warm agitated beverage. When the valve is open slight expansion of the beverage may take place in the outlet portion 26 of the valve so as to provide a limited amount of foam on the beverage which is dispensed into a glass or the like. Furthermore, the structure results in small bubbles or a "creamy-drink" instead of large foamy bubbles. The passage in effect has a constricted portion extending to the valve seat, and this passage is of uniform volume per unit of length so that the pressure is substantially reduced and the flow is reduced and maintained uniform. The frusto-conical extension 25 on the valve gently guides the beverage through the passage to reduce agitation or surging of the beverage, and probably also provides frictional resistance to flow of the beverage.

For connecting the draft pipe to the barrel I have shown a sleeve 27 loosely slidable upon the pipe 1 and having a packed connection 28 with the pipe at one end and its other end 29 formed to pass through a bushing gasket 30 in the bung hole 31 of the barrel. The sleeve 27 has a lateral passage 32 in which is an outwardly closing rubber check valve 33 of known construction and to which may be connected through a hose 34, any suitable source of gas under pressure. The gas may flow inwardly through the valve 33 and between the sleeve 27 and the pipe 1 into the barrel on top of the beverage therein, so as to form a blanket of inert gas over the beverage and thereby prevent liberation of the activating gases into the empty space in the barrel. Generally the pressure of the gas should be higher than that of the activating gases in the beverage, for example, the gas pressure injected through the sleeve 27 may be about eighteen pounds per square inch where the pressure of the gases in the beverage is aproximately fifteen pounds per square inch.

I have found that for the most satisfactory operation of the apparatus, the inside diameter of the draft passage through the tube 2, coil 9 and faucet up to the valve seat of the faucet, should be approximately $\frac{3}{16}$ths of an inch or the passage should have a cross-sectional area of approximately .027 of a square inch.

In operation of the apparatus, the pressure of the gas forces the beverage upwardly through the draft pipe to the valve seat 19, and when the valve is open, the beverage will be dispensed through the outlet 26 of the valve. This operation takes place without any splashing of the beverage into the glass, without dissipating the gases in the beverage, and without excessive foaming of the beverage in the glass.

The dead air space 4 between the pipe 1 and the tube 2 will insulate the beverage in the tube above the level of the beverage in the barrel so as to keep the beverage in the tube cold, while the space between the coil 9 and casing 8 may also be a dead air space or filled with suitable insulating material such as cork, for maintaining cold the beverage in the coil.

While I have shown and described the invention as embodied in certain details of construction it should be understood that this is primarily for illustrating the principles of the invention and that many modifications and changes may be made in the details of structure without departing from the spirit or scope of the invention.

Having thus described my invention, what I claim is:

1. A dispensing apparatus for drawing beverages containing activating gases from a barrel or container, comprising a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing check valve therein for connection to a supply of gas under pressure to supply such gas to said container.

2. The combination with a container for beverages having activating gases therein, of means for refrigerating the beverage in the container, a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing check-valve therein for connection to a supply of gas under pressure to supply such gas to said container.

3. The combination with a container for beverages having activating gases therein, of means for refrigerating the beverage in the container, a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing check-valve therein for connection to a supply of gas under pressure to supply such gas to said container, said tube and the tubing of the coil having an inside diameter of approximately three-sixteenths of an inch.

4. Apparatus for dispensing beer comprising a container, means for maintaining gas pressure on the beer in said container greater than that of the activating gases to keep the beer in calm liquid state, a faucet, and means providing a passage for the beer leading from a point adjacent the bottom of said container to the valve seat of said faucet, said passage having a constricted portion of uniform cross sectional area extending to the valve seat of the faucet to substantially reduce the pressure therein and produce small and substantially uniform volume of flow therethrough.

5. Apparatus for dispensing beer comprising a container, means for maintaining gas pressure on the beer in said container greater than that of the activating gases to keep the beer in calm liquid state, a faucet having a valve seat and a valve, and means providing a passage leading from a point adjacent the bottom of said container to said valve seat, said passage having a constricted portion of uniform volume per unit of length extending to said valve seat to substantially reduce the pressure of the beer and produce small and substantially uniform volume of flow through the passage.

6. Apparatus for dispensing beer comprising a container, means for maintaining gas pressure on the beer in said container greater than that of the activating gases to keep the beer in calm liquid state, a faucet having a valve seat and a valve, and means providing a passage leading from a point adjacent the bottom of said container to said valve seat, said passage having a constricted portion extending continuously to the valve seat with no increase in volume per unit of length.

7. The apparatus set forth in claim 5 wherein said valve has a conical extension with its smaller end directed into said passage, and said passage has a correspondingly shaped portion receiving said extension so as to divide the beer into a hollow frusto-conical stream, thereby to smoothly guide the beer around the valve, prevent agitation of the beer and frictionally resist the flow and thereby further reduce the pressure of the beer.

8. The method of dispensing beer from a container, consisting in maintaining gas pressure on the beer in the container to keep the beer in calm liquid condition and prevent expansion of the activating gases in the beer, drawing the beer from a point adjacent the bottom of the container, and substantially frictionally resisting the flow and maintaining substantially uniform and small volume of flow continuously to the point of discharge.

HERMAN H. HARR.